(12) United States Patent
Lawrence

(10) Patent No.: US 7,992,453 B1
(45) Date of Patent: Aug. 9, 2011

(54) EROSION-RESISTANT INSERT FOR FLOW MEASUREMENT DEVICES

(75) Inventor: Philip A. Lawrence, Kingwood, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 13/007,555

(22) Filed: Jan. 14, 2011

(51) Int. Cl.
*G01F 1/34* (2006.01)

(52) U.S. Cl. .................................................. 73/861.42

(58) Field of Classification Search ............... 73/861.42, 73/861.52, 861.63, 861.55, 861.47
See application file for complete search history.

(56) References Cited

U.S. PATENT DOCUMENTS

| | | | |
|---|---|---|---|
| 4,638,672 A | 1/1987 | McCall | |
| 4,812,049 A | 3/1989 | McCall | |
| 5,363,699 A | 11/1994 | McCall | |
| 5,814,738 A * | 9/1998 | Pinkerton et al. | 73/861.55 |
| 5,970,801 A | 10/1999 | Ciobanu et al. | |
| 6,164,141 A * | 12/2000 | Chalvignac et al. | 73/861.52 |
| 6,314,821 B1 * | 11/2001 | Allan | 73/861.52 |
| 6,324,917 B1 | 12/2001 | Mack et al. | |
| 6,474,177 B2 | 11/2002 | Maeda et al. | |
| 6,651,514 B2 | 11/2003 | Zanker | |
| 6,843,183 B2 | 1/2005 | Strong | |
| 6,865,957 B1 | 3/2005 | Hughes et al. | |
| 7,047,822 B2 | 5/2006 | Good et al. | |
| 7,478,565 B2 * | 1/2009 | Young | 73/861.65 |
| 7,897,121 B1 * | 3/2011 | Hughes et al. | 422/224 |
| 2003/0019301 A1 * | 1/2003 | Richards et al. | 73/861.53 |

FOREIGN PATENT DOCUMENTS

| | | |
|---|---|---|
| GB | 430970 | 6/1935 |
| GB | 2411476 | 8/2005 |
| KR | 2010007448 | 10/2010 |
| WO | WO8801369 | 2/1988 |
| WO | WO2006022702 | 3/2006 |

OTHER PUBLICATIONS

U.S. Appl. No. 13/001,030, filed Dec. 22, 2010, Philip A. Lawrence.

* cited by examiner

*Primary Examiner* — Jewel Thompson
(74) *Attorney, Agent, or Firm* — Fletcher Yoder

(57) ABSTRACT

An erosion-resistant insert is provided for a flow measurement device having a fluid displacement member. The insert includes a flange and a sleeve extending axially from the flange. The sleeve may be inserted into a recess machined into a fluid conduit of the fluid measurement device to protect the inner wall of the conduit. The insert maintains the inner diameter of the conduit and the beta ratio of the flow measurement device.

20 Claims, 18 Drawing Sheets

EROSION-RESISTANT INSERT FOR FLOW MEASUREMENT DEVICES

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Transport of fluids, such as in oil and gas systems, power generation systems, etc., relies on a variety of components and devices. For example, fluids may be transported through a complex network of pipes, fittings, and processing equipment. Such networks may be a part of pipelines or other transportation structures to transport the fluid from a source to a destination, such as further transportation systems or storage facilities. Such pipelines or other transportation structures may include pressure control, regulation, and safety devices, which may include valves, actuators, sensors, and electronic circuitry.

It may be desirable to measure the flow rate of the fluid in such systems. One particular type of flow rate measurement device may be referred to as a differential pressure meter. A differential pressure meter places a fluid displacement member centrally within the flow path of a fluid. As the fluid flows around the displacement member, the fluid displacement member causes differential pressure in the fluid. The difference in pressure may be measured via taps disposed on the upstream and downstream portions of the fluid displacement member. The flow rate of the fluid may be determined from the difference in pressure.

The differential pressure meters are designed for use with and calibrated for specific types of fluids and flow rate ranges. During operation, the actual flow rate of a fluid may be outside the range measured by the meter, and, the type or composition of the fluid may also change.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention include a beta ratio changer (also referred to as area ratio changer) for various metering devices. For certain flow meters having a beta ratio, embodiments of the present invention may be referred to as a beta ratio changer. For other meters that do not rely on a beta ratio, embodiments of the present invention may be referred to as an area ratio changer. In one embodiment, the beta ratio changer may be used to change the beta ratio of a differential pressure flow meter having a fluid displacement member disposed in a conduit. The beta ratio changer may also be formed of an erosion-resistant material to protect the inner walls of a conduit of the flow meter from a fluid. Other embodiments of the invention include an erosion-resistant insert for the flow meter. The erosion-resistant insert may maintain the diameter of a conduit of the flow meter and protect the inner walls of the conduit from a fluid. The erosion-resistant insert may also maintain the beta ratio (or area ratio) of the flow meter. In some embodiments, a recess (e.g., an annular recess) may be machined in a conduit of a body of a flow meter to receive the erosion-resistant insert. The sleeve of the erosion-resistant insert (and, in some embodiments, the flange of the insert), may be formed from an erosion-resistant material.

Figure 1:
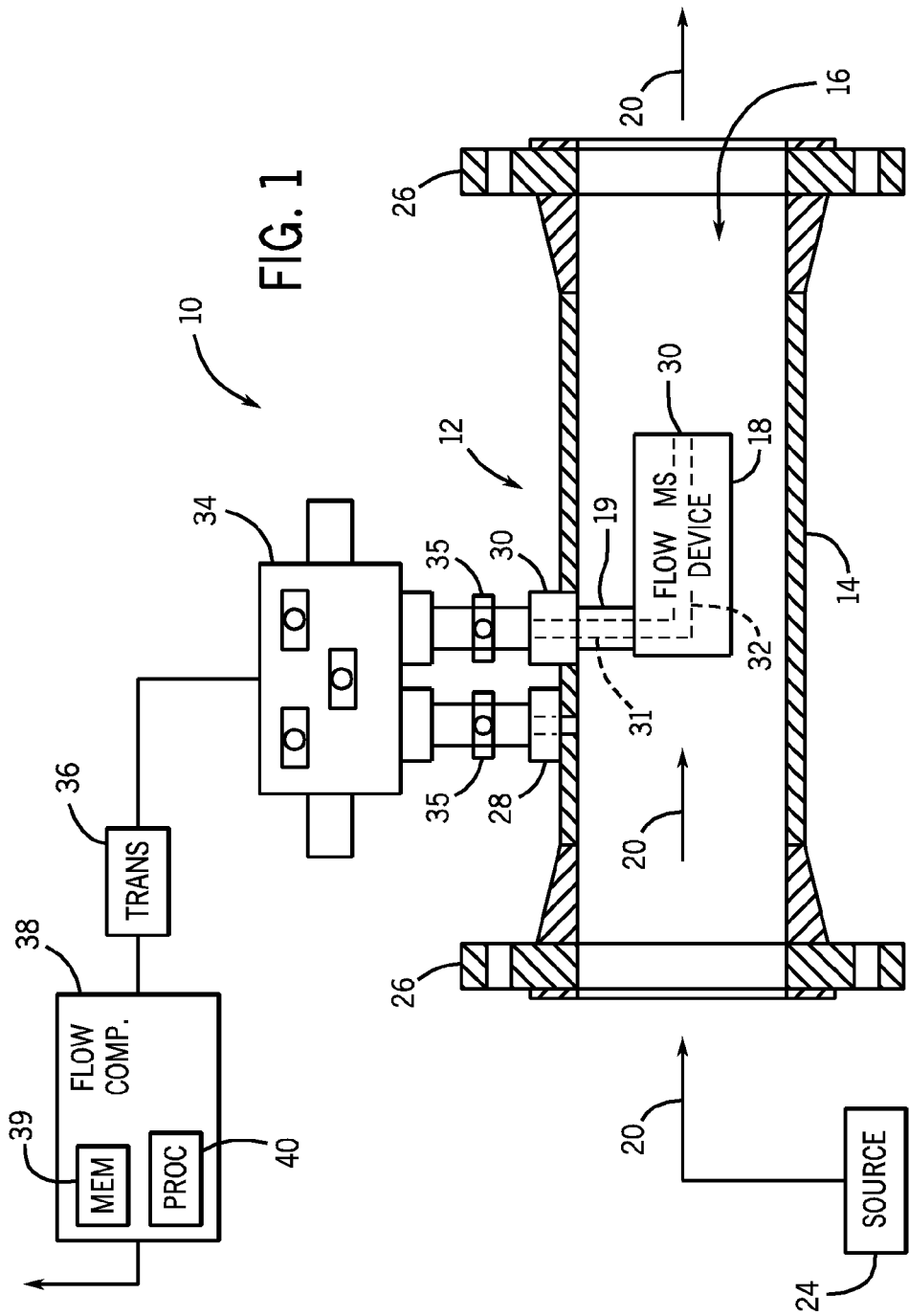
FIG. 1 is a diagram of a differential pressure flow meter in accordance with an embodiment of the present invention.

FIG. 1 depicts a system 10 having a flow measurement device, e.g., a differential pressure flow meter 12, in accordance with an embodiment of the present invention. The differential pressure meter 12 includes a meter body 14 having a conduit 16 through which fluid may flow. A fluid displacement member 18 may be centrally disposed in the conduit 16 and suspended from the conduit 16 via a support 19. Fluid may flow through the conduit 16 and over the fluid displacement member 18 in the direction indicated by arrows 20. The fluid may flow into the conduit 16 of the meter 12 either directly or indirectly from a source 24. For example, the source 22 may be a source of oil, natural gas (such as coal bed methane), steam, or any other suitable fluid. The meter body 14 may include flanges 26 to provide for installation in a pipeline (e.g., between pipe sections) or other transportation structure. The flanges 26 may be secured to other structure via bolts, welds or any other suitable techniques.

As the fluid flows through the conduit 16, the fluid displacement caused by the fluid displacement member 18 may introduce a difference in pressure between the upstream fluid (e.g., upstream of the member 18) and the downstream member (e.g., downstream of the member 18). In some embodiments, the fluid displacement member 18 may have one or more frustum portions, conical portions, or any other shaped portions suitable for creating a pressure differential in the fluid. In yet other embodiments, multiple fluid displacement members may be included in the meter body 14 of the flow measurement device 12. In some embodiments, the fluid displacement member 18 may be removably attached by and to the support 19 such that the member 18 may be removed and/or replaced. In other embodiments, the member 18 may be permanently secured by the support 19, such as by welding.

The meter body 14 may include an upstream pressure tap 28 in fluid communication with the conduit 16 and a downstream pressure tap 30 in fluid communication with the interior of the fluid displacement member 18 and the downstream portion of the conduit 16, such as via hollow region 32 (e.g., interior passage) of the support 19 and hollow region 31 (e.g., interior passage) of the fluid displacement member 18. The difference in pressure measured at the upstream tap 28 and the downstream tap 30 may be used to determine the flow rate of the fluid flowing through the conduit 16.

The upstream tap 28 and downstream tap 30 may be coupled to a valve manifold 34. Valves 35 may be coupled between the manifold 34 and the taps 28 and 30. The manifold 34 may be coupled to a transmitter 36 that records the differential pressure signal generated by the meter 12 and provides an output (e.g., an analog or serial output) to a computer 38, such as a flow computer or data control system having memory 39 and processor 40. The manifold 34 isolates the transmitter 36 from the process fluid and may enable maintenance and calibration of the transmitter 36. It should be appreciated that the system 10 may include any other devices suitable for controlling and/or monitoring the fluid flowing through the conduit 16, such as a resistance temperature detector (RTD).

Figure 2:
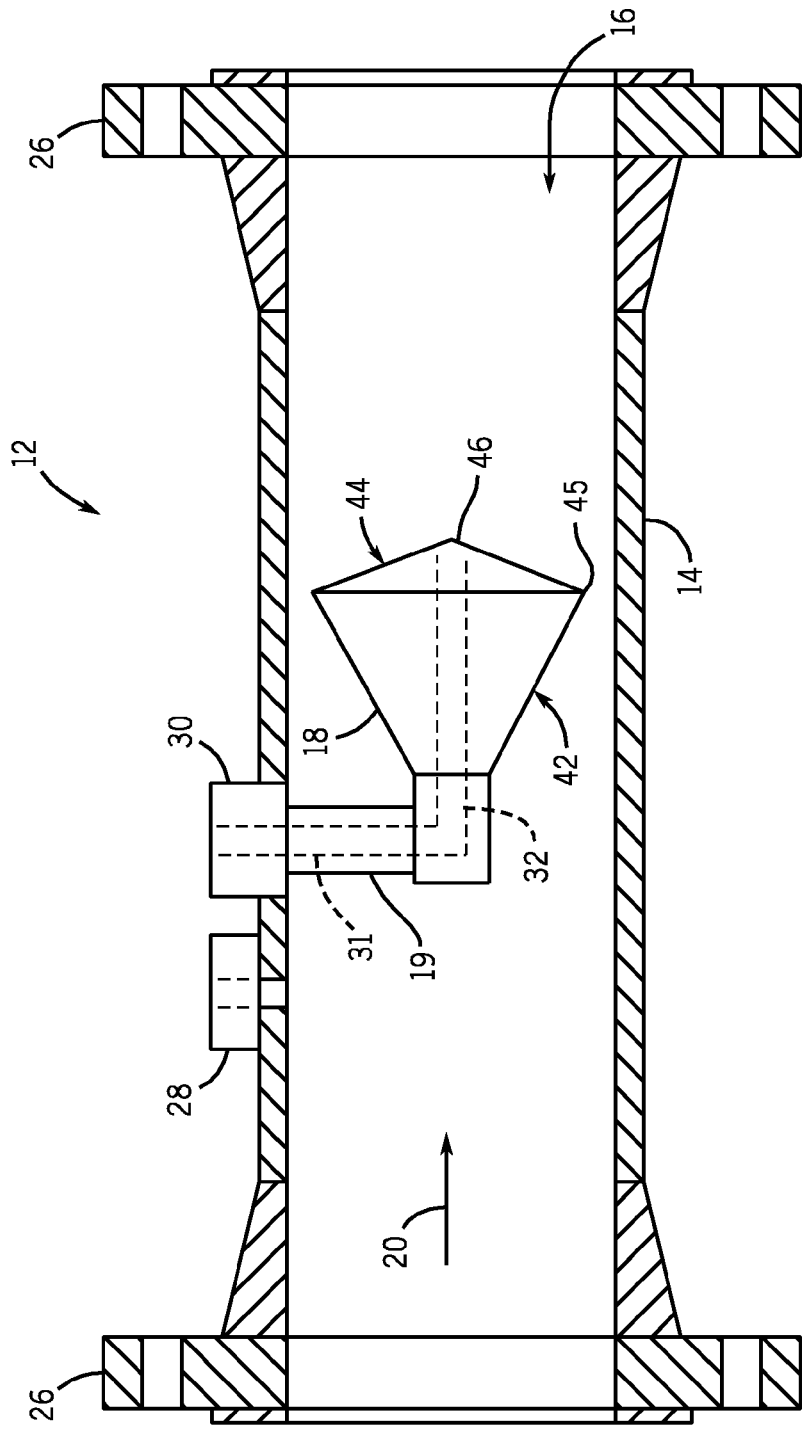
FIG. 2 is a partial cross-section of the meter of FIG. 1 in accordance with an embodiment of the present invention.

FIG. 2 depicts a cross-section of the meter 12 illustrating the fluid displacement member 18 having an upstream frustum 42 and a downstream frustum 44 in accordance with an embodiment of the present invention. As illustrated, the upstream frustum 42 comprises a diverging cone relative to the fluid flow direction 20, whereas the downstream frustum 44 comprises a converging cone relative to the fluid flow direction 20. The interface between the upstream frustum 42 and downstream frustum 44 forms a peripheral edge 45 (also referred to as cantilevered edge). As shown in FIG. 2, the downstream frustum 44 may include a hole 46 connected to hollow region 32 to enable fluid communication between the downstream tap 30 and the fluid downstream from the member 18. The shape of the member 18 may be designed to reshape the fluid velocity provide upstream of the member 18, creating a pressure drop between the downstream and upstream portions of the fluid in the conduit 16.

The calibration and accurate measurement of the meter 12 depends in part on the "beta ratio" (also referred to as area ratio). The beta ratio refers to the ratio between the diameter of the peripheral edge 45 and the diameter of the conduit 16. Additionally, the slope of the downstream frustum may be referred to as a "beta angle." The beta ratio may be determined as follows:

$$\beta = \frac{\sqrt{D^2 - d2}}{D} \tag{1}$$

Where:

$\beta$=the beta ratio;

D=the diameter of the conduit 16; and d=the diameter of the downstream frustum at the peripheral edge.

After determination of the Beta ratio, the mass flow rate of the fluid may be determined as follows:

$$qm = N_1 CdEvY(\beta D)^2 \sqrt{\rho_{t,p} \Delta P} \tag{2}$$

Where:

qm is the mass flow rate;

$N_1$ is a units constant;

Cd is a discharge coefficient that may determined during calibration of the meter;

$\rho_{t,p}$ is the fluid density at flowing conditions;

$\Delta P$ is the differential pressure (that may be determined from data received the upstream tap 28 and downstream tap 30;

For Equation 2, Y may have a value of 1 for incompressible fluids. For compressible fluids, Y may be experimentally determined or calculated by various techniques, such as according to the following equation:

$$Y = 1 - (0.41 + 0.35\beta^4) \frac{\Delta P}{k} \tag{3}$$

Where:

k is the gas isentropic exponent.

For Equation 2, Ev may be determined from the beta ratio ($\beta$) as follows:

$$Ev = \frac{1}{\sqrt{1-\beta^4}} \quad (4)$$

After determination of the mass flow rate, volumetric rates of the fluid may be determined. For example, the volumetric flow rate at flowing conditions (also referred to as "gross" or "actual" flow rates) may be determined as follows:

$$qv = \frac{qm}{\rho_{t,p}} \quad (5)$$

Where:
qv is the volumetric flow rate at flowing conditions.

Similarly, the volumetric flow rate at based conditions (also referred to as "standard" flow rates) may be determined as follows:

$$Qv = \frac{qm}{\rho_b} \quad (6)$$

Where:
Qv is the volumetric flow rate at base conditions; and
$\rho_b$ is the fluid density at base conditions.

It should be appreciated that changes in temperature, Reynolds number of the fluid, or any other parameter may be compensated for in the above equations by using suitable correction techniques.

The fluid flowing from the source 24, such as a well, may be produced under gradually less pressure as the amount of fluid in the well decreases. In such an embodiment, the originally designed and calibrated beta ratio of the meter 12 may have a measurable range unsuitable for the lower flow rate of the fluid. Additionally, the meter 12 may be moved and used in a new system having a different fluid flow rate or a different type of fluid.

Figure 3A:
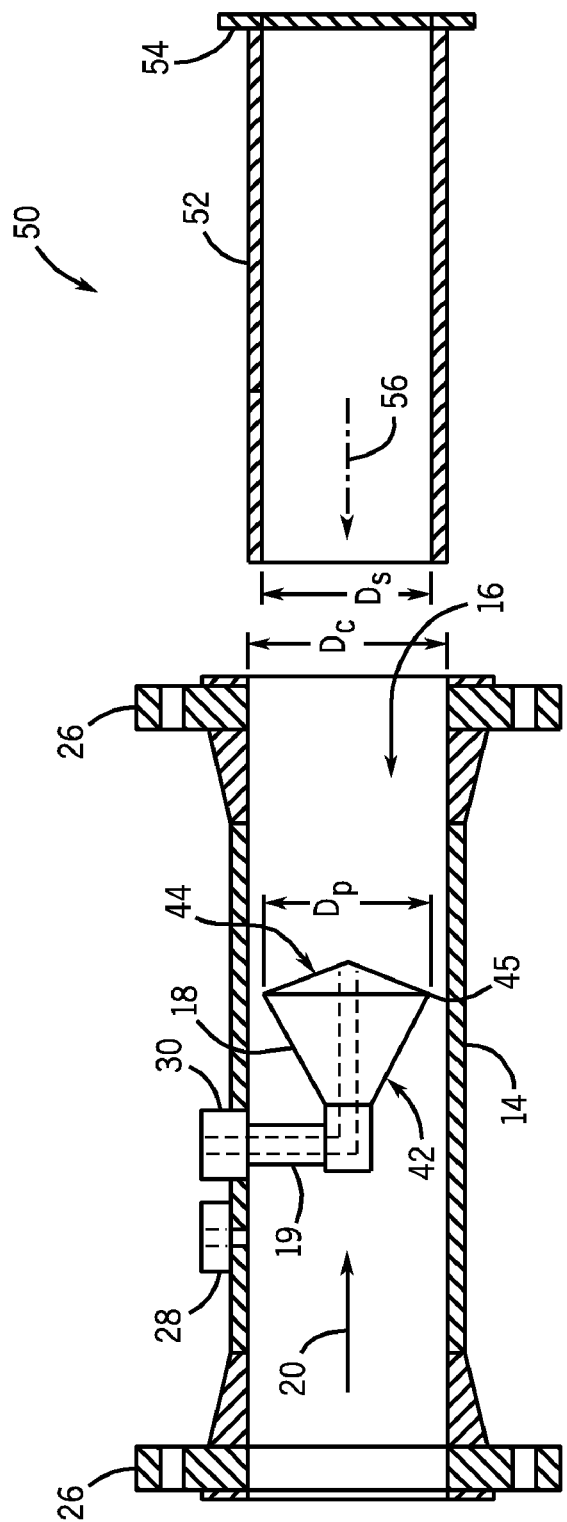
FIGS. 3A and 3B are cross-sections of an area ratio changer used with the differential pressure flow meter of FIG. 2 in accordance with an embodiment of the present invention.
Figure 3B:
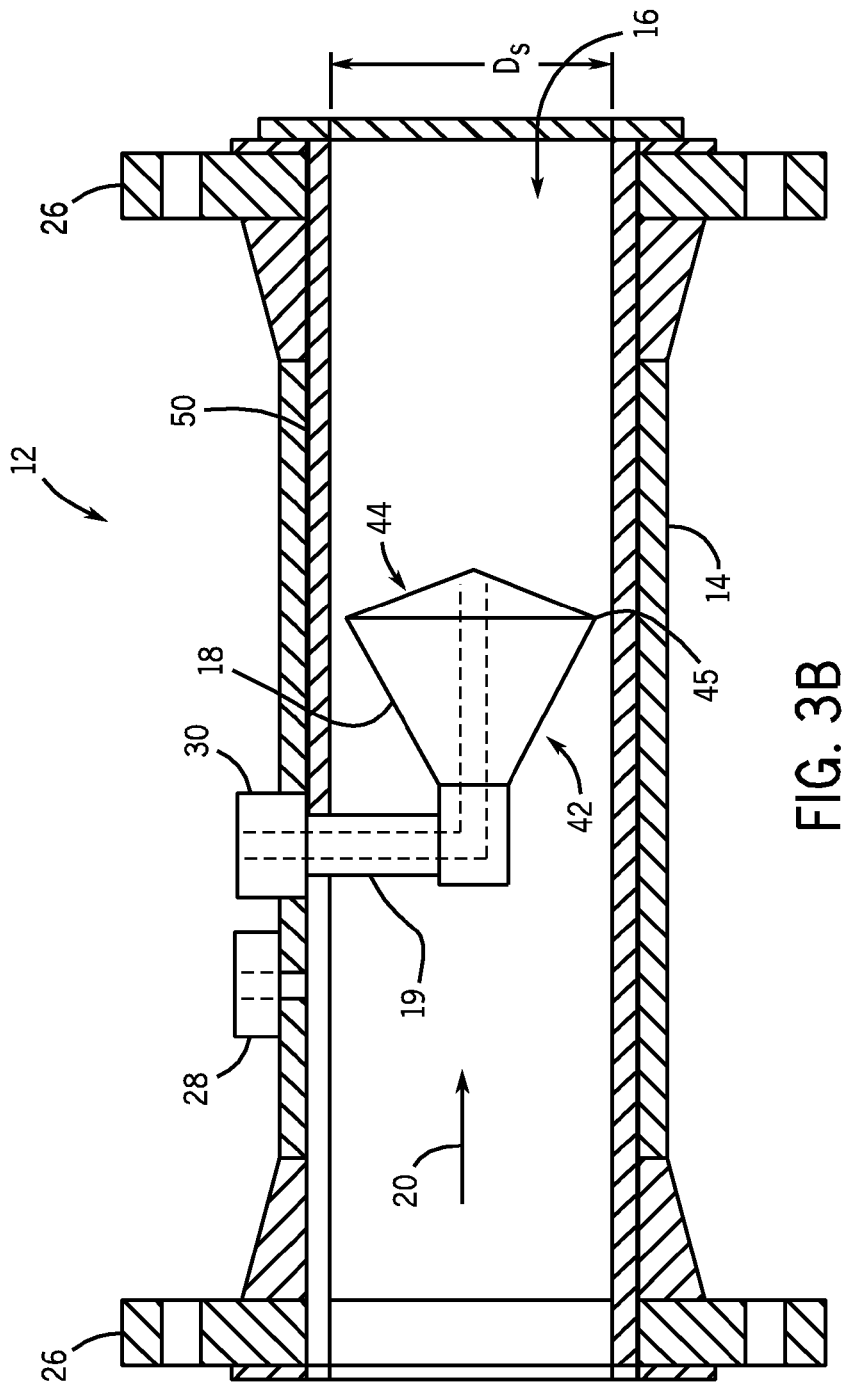

FIGS. 3A and 3B depict a beta ratio changer 50 used with the meter 12 in accordance with an embodiment of the present invention. The beta ratio changer 50 may include an annular sleeve 52 and a flanged portion 54. The annular sleeve 52 extends axially from the flanged portion 54. The sleeve 52 includes an inner diameter ($D_S$) that is smaller than the inner diameter ($D_C$) of the conduit 16. The sleeve 52 of the beta ratio changer 50 may reduce the diameter of the conduit 16 around the region of the fluid displacement member 18. As shown in FIG. 3A, the peripheral edge 45 of the fluid displacement member 18 has a diameter of $D_P$. Thus, according to Equation 1 above, the meter 12 depicted in FIG. 3A had a beta ratio of:

$$\beta_{3A} = \frac{\sqrt{D_C^2 - D_P 2}}{D_C} \quad (7)$$

By reducing the diameter of the conduit 16, the relationship between the diameter $D_P$ of the peripheral edge 45 and the diameter $D_C$ of the conduit may be modified to change the beta ratio of the meter 12. As shown in FIG. 3A and illustrated by arrow 56, the beta ratio changer 50 may be inserted into the meter 12 to reduce the inner diameter of the conduit 16.

As shown in FIG. 3B, after installation of the beta ratio changer 50, the inner diameter $D_C$ of the conduit 16 is now equal to the inner diameter of the sleeve 52, i.e., $D_C = D_S$. Accordingly, the assembly of the meter 12 and beta ratio changer 50 has a different beta ratio than the unmodified meter 12. According to Equation 1, the meter 12 depicted in FIG. 3B has a beta ratio as follows:

$$\beta_{3A} = \frac{\sqrt{D_S^2 - D_P 2}}{D_S} \quad (8)$$

To enable insertion of the beta ratio changer 50 through the region of the conduit 16 that includes the fluid displacement member 18 and support, the beta ratio changer 50 may include a slot (illustrated below in FIG. 4) in the sleeve 52.

Figure 4:
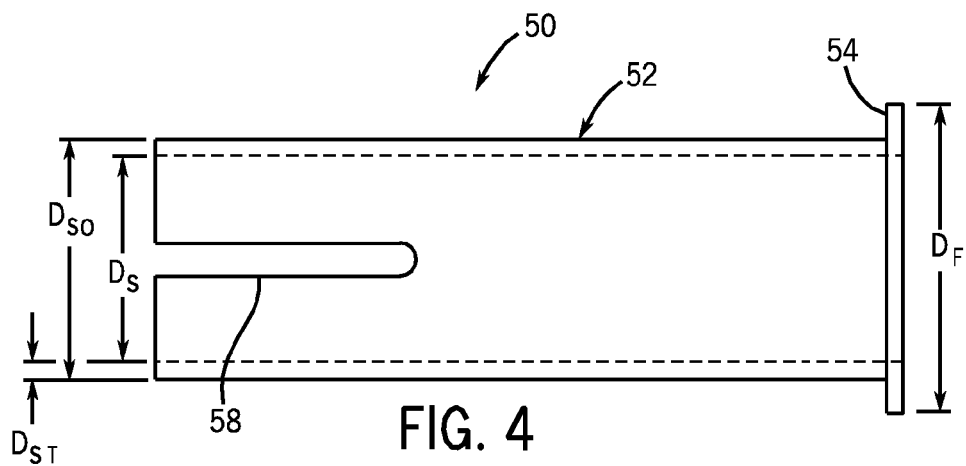
FIG. 4 is a cross-section of the area ratio changer of FIGS. 3A and 3B in accordance with an embodiment of the present invention.

FIG. 4 depicts a cross-section of the beta ratio changer 50 in accordance with an embodiment of the present invention. As discussed above, the beta ratio changer 50 includes the flanged portion 54 and the sleeve 52 having a slot 58. The slot 58 may extend axially along the length of the sleeve 52 to enable the flange 54 to be flush with the flange of the body of the meter 12 when the beta ratio changer 50 is inserted into the body of the meter 12. The slot 58 may receive the upstream and downstream ports 28 and 30, enabling the sleeve 52 to be inserted around the ports. Further, the slot 32 ensures fluid communication between the port 28 and the interior of the sleeve 52.

The sleeve 52 may define an outer diameter $D_{SO}$ and the inner diameter $D_S$, as mentioned above, and define a thickness $D_{ST}$ of the sleeve 52. By varying the thickness $D_{ST}$ of the sleeve 52, i.e., by varying the inner diameter Ds, the beta ratio of the meter 12 may be adjusted.

The flange 54 may have an outer diameter $D_F$ approximately the same as or less than the outer diameter of the flange of the body 14 of the meter 12. The flange 54 may be of relatively reduced thickness compared to the thickness of the flange 26 of the body 14 of the meter 12, such that when the flange 54 of the beta ratio changer 50 provides minimal increase of thickness between the meter 12 and other components.

Figure 5:
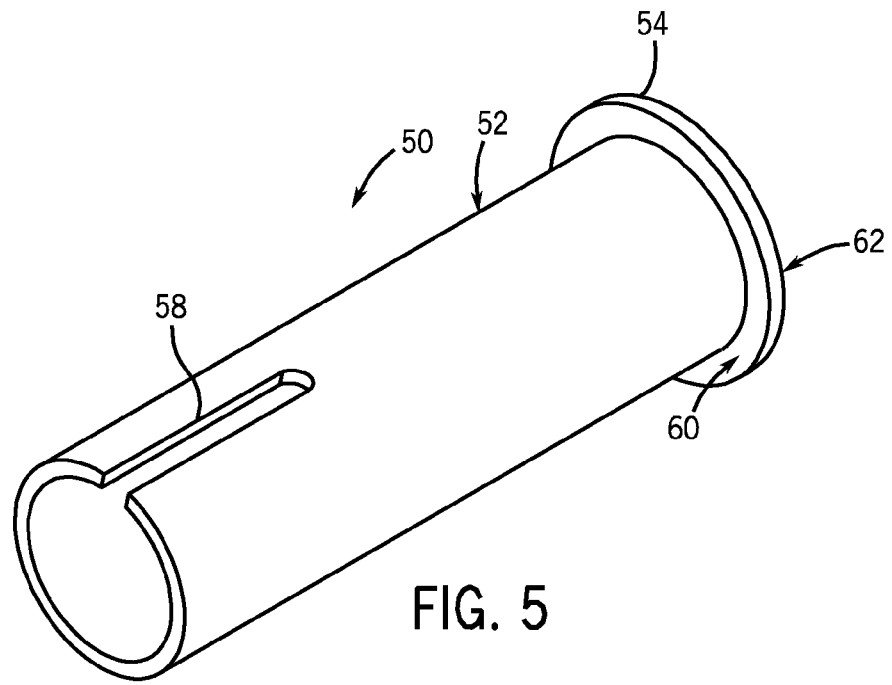
FIG. 5 is a perspective view of the area ratio changer of FIGS. 3A and 3B in accordance with an embodiment of the present invention.

FIG. 5 is a perspective view of the beta ratio changer 50 in accordance with an embodiment of the present invention. As shown in FIG. 5, the beta ratio changer 50 may be rotated so that the slot 58 of the sleeve 52 is rotated to any desirable position. During installation of the beta ratio changer 50, the sleeve 52 may be rotated to rotationally align the slot 58 with the support 19 of the meter 12 having the upstream tap 28 and downstream tap 30. During installation, one or more seals, e.g., o-rings, may be disposed on a first face 60 of the flange 54 and a second face 62 of the flange 54 to ensure sealing against the flange 26 of the meter 12 and any components coupled to the meter 12. In some embodiments, the area ratio changer 50 may be formed from stainless steel, carbon steel, or any suitable material. The interior surface of the sleeve 52 may be formed to at least a surface finish of International Organization for Standardization (ISO) Standard 1302.

Figure 6A:
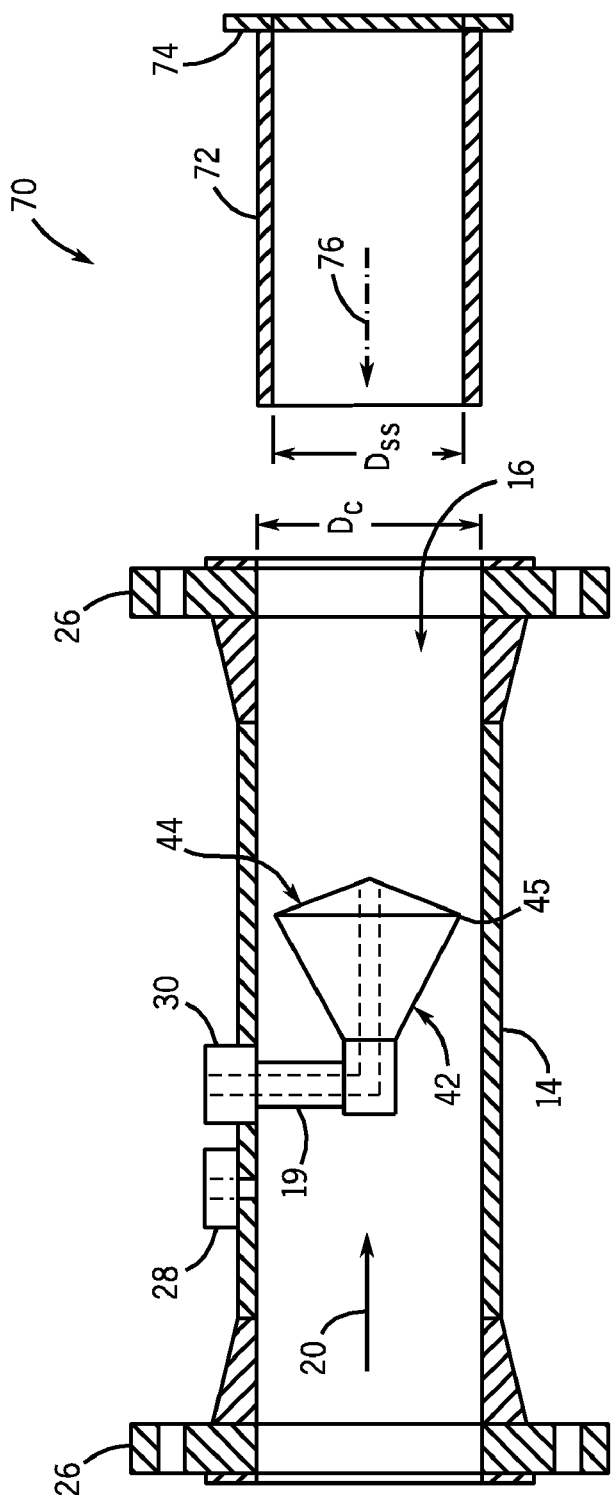
FIGS. 6A and 6B are cross-sections of an area ratio changer having a short sleeve and used with the differential pressure flow meter of FIG. 2 in accordance with an embodiment of the present invention.
Figure 6B:
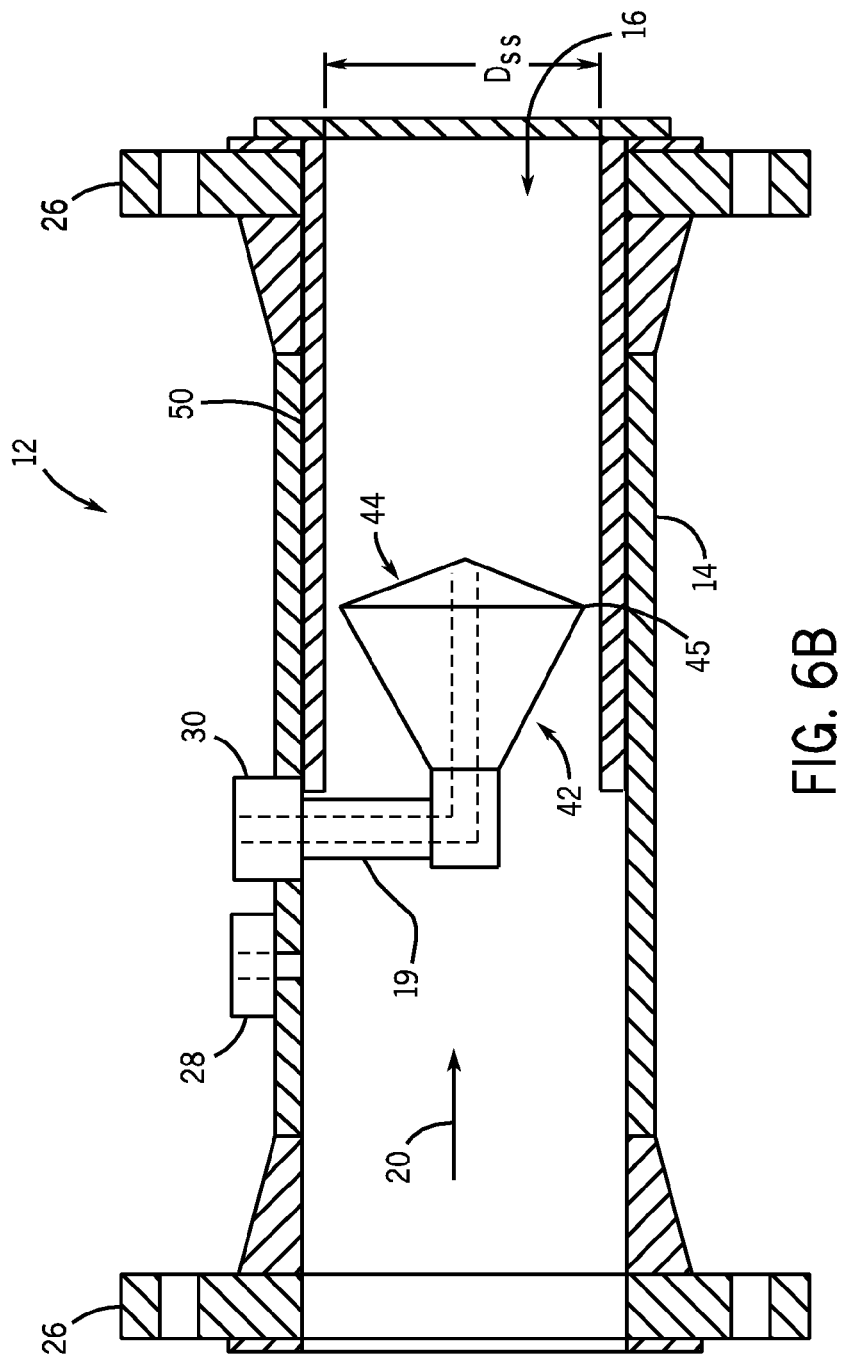

In other embodiments, an area ratio changer may include a sleeve that extends only over the peripheral edge 45 (cantilevered edge) of the fluid displacement member 18 without extending over the support 15. FIGS. 6A and 6B depict a beta ratio changer 70 having a reduced length and the meter 12 in accordance with an embodiment of the present invention. The beta ratio changer 70 includes a shortened annular sleeve 72 extending axially from a flanged portion 74. The sleeve 72 includes an inner diameter Dss that is smaller than the inner diameter Dc of the conduit 16, enabling reduction of the diameter of the conduit 16 of the meter 12 when the beta ratio changer 70 is installed in the meter 12. However, because the shortened sleeve 72 only extends up to and around the peripheral edge 45 of the fluid displacement member 18, the sleeve 72 does not include any slot or other recess.

As discussed above, the peripheral edge 45 of the fluid displacement member 18 has a diameter of $D_P$. Thus, according to Equation 1 above, the meter 12 depicted in FIG. 3A had a beta ratio of:

$$\beta_{3A} = \frac{\sqrt{D_C^2 - D_P 2}}{D_C} \quad (9)$$

As described above, by reducing the diameter of the conduit 16, the relationship between the diameter $D_P$ of the peripheral edge 45 and the diameter Dc of the conduit may be modified to change the beta ratio of the meter 12. As shown in FIG. 6A and illustrated by arrow 76, the beta ratio changer 70 may be inserted into the meter 12 to reduce the inner diameter of the conduit 16.

As shown in FIG. 6B, once inserted in the conduit 16 of the meter 12, the beta ratio changer 70 only extends up to and around the peripheral edge 45 of the fluid displacement member 18, i.e., that portion of the member 18 defined by the intersection of the upstream frustum 42 and downstream frustum 44. By extending over the peripheral edge 45, the beta ratio changer 70 changes the beta ratio of the meter 12 (as compared to the beta ratio of the configuration depicted in FIG. 6A) by reducing the inner diameter Dc of the conduit 16 over the fluid displacement member 18.

As shown in FIG. 6B, after installation of the beta ratio changer 70, the inner diameter $D_C$ of the conduit 16 is now equal to the inner diameter of the sleeve 72, i.e., $D_C = D_{SS}$. Accordingly, the assembly of the meter 12 and beta ratio changer 70 has a different beta ratio than the unmodified meter 12. According to Equation 1, the meter 12 depicted in FIG. 6B has a beta ratio as follows:

$$\beta_{3A} = \frac{\sqrt{D_{S_S}^2 - D_P 2}}{D_{S_S}} \quad (10)$$

Figure 7:
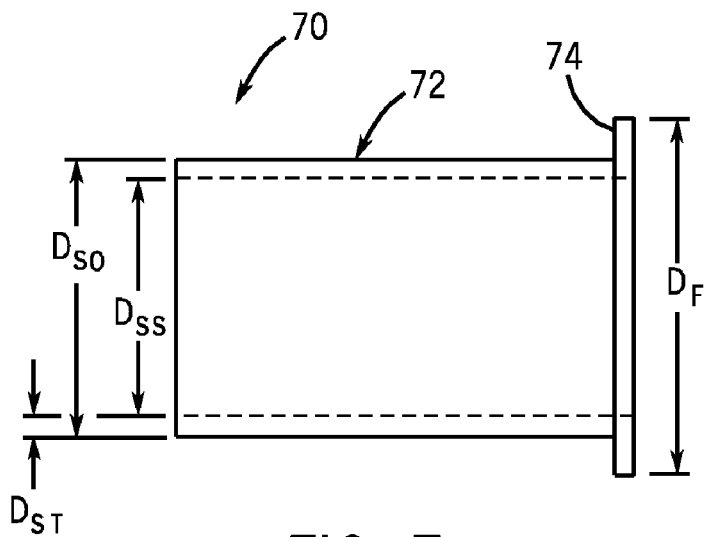
FIG. 7 is a cross-section of the area ratio change of FIGS. 6A and 6B in accordance with an embodiment of the present invention.

FIG. 7 depicts a cross-section of the beta ratio changer 70 in accordance with another embodiment of the present invention. As discussed above, the beta ratio changer 70 includes the flanged portion 74 and a sleeve 72. As noted above in FIGS. 6A and 6B, the sleeve 72 of the ratio area changer 70 does not include any slot or other recess in the sleeve 72. The sleeve 72 may define an outer diameter $D_{SO}$ and the inner diameter $D_{SS}$, as mentioned above, defining a thickness $D_{ST}$ of the sleeve 72. By varying the thickness $D_{ST}$ of the sleeve 72, i.e., by varying the inner diameter $D_{SS}$, the beta ratio of the meter 12 may be adjusted.

The flange 74 may have an outer diameter $D_F$ approximately the same as or less than the outer diameter of the flange 26 of the body 14 of the meter 12. The flange 74 may be of relatively reduced thickness compared to the thickness of the flange 26 of the body 14 of the meter 12, such that when the flange of the beta ratio changer 70 provides minimal increase of thickness between the flange 26 and other components.

Figure 8:
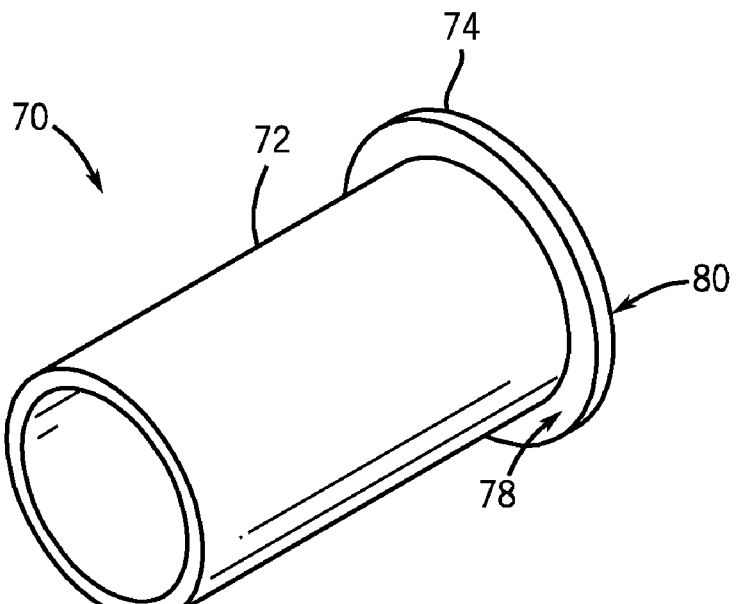
FIG. 8 is a perspective view of the area ratio changer of FIGS. 6A and 6B in accordance with an embodiment of the present invention.

FIG. 8 is a perspective view of the beta ratio changer 70 of FIG. 7 in accordance with an embodiment of the present invention. During installation, one or more seals, e.g., o-rings, may be disposed on a first face 78 of the flange 74 and a second face 80 of the flange 74 to ensure sealing against the flange 26 of the meter 12 and any components coupled to the meter 12. In some embodiments, the beta ratio changer 70 may be formed from stainless steel, carbon steel, or any suitable material. The interior wall of the sleeve 72 may be formed to at least a surface finish of ISO Standard 1302. The beta ratio changer 70 having a reduced sleeve length may be cheaper and easier to manufacture than the beta ratio changer 50 shown above in FIGS. 3-5. For example, manufacture of the beta ratio changer 70 may use less material and require less machining than the beta ratio changer 50 discussed above in FIGS. 3-5.

The beta ratio changers 50 and 70 described above may provide a 10%, 20%, 30%, 40%, 50%, 60%, 70%, 80%, 90%, or any other percentage, change to the beta ratio of the flow meter 12. In some embodiments, one or a plurality of beta ratio changers 50 or 70 may be packaged with the meter 12 and sold as a single unit. For example, each included beta ratio changer 50 or 70 may have a different sleeve thickness and inner diameter, allowing selection among multiple beta ratios. In such an embodiment, the meter 12 may be calibrated for each included beta ratio changer 50 or 70, thus expanding the usable range of the meter 12 when installed in the field. By installing, removing, or interchanging various area ratio changers, the beta ratio of the meter 12 may be changed in the field without replacement of the meter 12. In other embodiments, the area ratio changers 50 and/or 70 may be sold as a retrofit kit to enable installation on existing meters. In these embodiments, the beta ratio changer may enable changing of the beta ratio changer of existing meters installed in the field without replacement of the entire meter assembly.

Figure 9A:
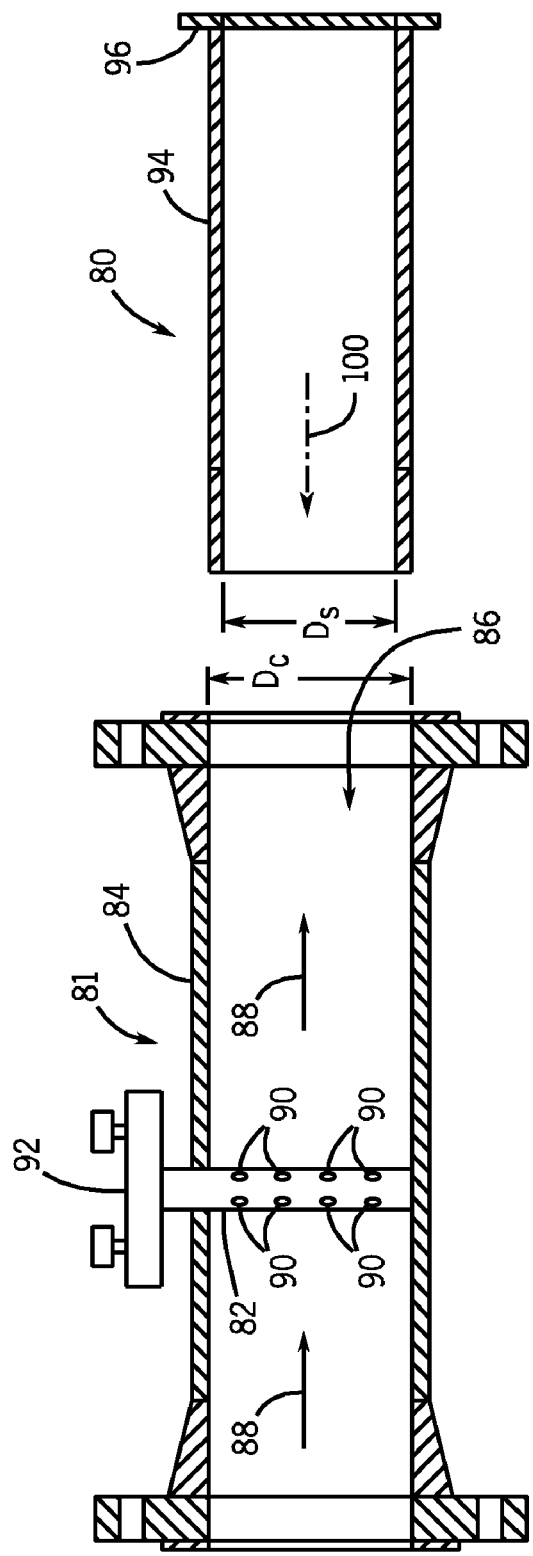
FIGS. 9A and 9B are cross-sections of an area ratio changer used with a Pitot tube in accordance with an embodiment of the present invention.

In other embodiments, an area ratio changer as described above may be used with any metering devices that use a pressure measurement element. FIG. 9A depicts use of an area ratio changer 80 with a flow meter 81 having a Pitot tube 82 in accordance with an embodiment of the present invention. The Pitot tube 82 may be installed in a structure 84, e.g., a pipe, having a conduit 86. As shown in FIG. 9A, fluid may flow in the conduit 86 in the direction illustrated by arrows 88. The Pitot tube 82 may include one or more holes 90 to enable measurement of the stagnation pressure of the fluid. The Pitot tube 82 may be coupled to a manifold 92 which may provide fluid communication to the static pressure measured by the Pitot tube 82 and/or fluid communication to other portions of the conduit 86, such as upstream or downstream from the Pitot tube 82.

In certain embodiments, the Pitot tube device 82 may be designed for a specific range of flow rates and/or type of fluid. In such an embodiment, any reduction in flow of the fluid through the conduit 86 may result in reduced accuracy or failure of the meter 81 due to the reduced flow range. In such an embodiment, the area ratio changer 80 may be inserted into the conduit 86 to reduce the interior volume of the conduit and increase the flow rate of the fluid, enabling metering capability by the meter 81.

As described above, the area ratio changer 80 may include a sleeve 94 and a flange 96 to enable installation into the conduit 86. The sleeve 94 may include an inner diameter Ds less than the inner diameter $D_C$ of the conduit 86. The area ratio changer 80 may include a slot, similar to the embodiment depicted above in FIGS. 3-5, to enable insertion around the Pitot tube 82, reducing the diameter in portions of the conduit 86 upstream and downstream from the conduit 16. The area ratio changer 80 may be installed in the conduit 86 as indicated by arrow 100 of FIG. 9A.

Figure 9B:
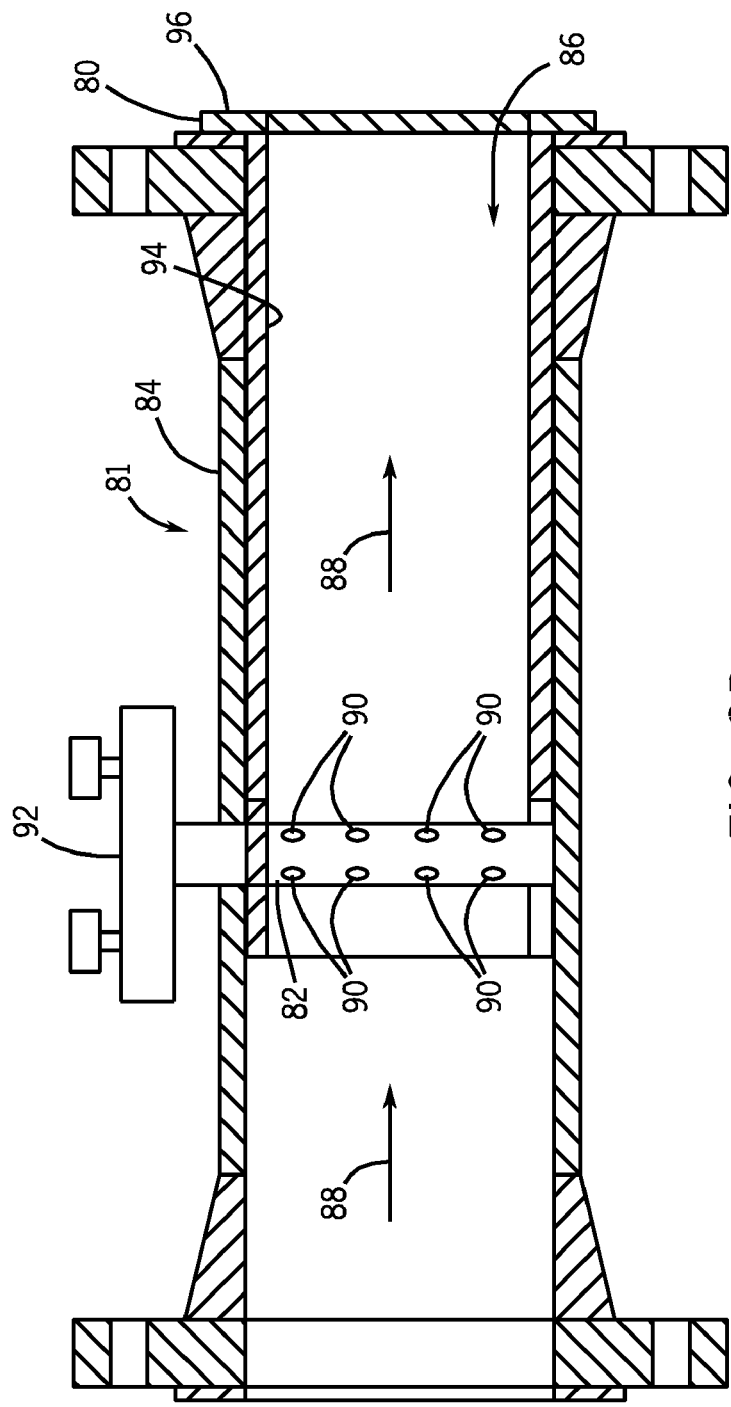

FIG. 9B depicts the installed area ratio changer 80 in the meter 81 in accordance with an embodiment of the present invention. As shown in FIG. 9B, the sleeve 94 extends into the portions of the conduit 86 downstream and upstream of the Pitot tube 82. Thus, after installation of the area ratio changer 80, the conduit 86 has a reduced diameter equal to the inner diameter $D_S$ of the sleeve 94 (i.e., $D_C=D_S$) downstream and upstream of the Pitot tube 82. By reducing the inner diameter of the conduit 86, the velocity of the fluid in the conduit 86 may be increased to within a range measurable by the meter 81. The inner diameter of the sleeve 94 of the area ratio changer 80 may be selected to increase the flow velocity to any desirable range, thus enabling functionality of the meter 81 and Pitot tube 82. Advantageously, installation of the area ratio changer 80 avoids removal and replacement of the meter 81 and purchase and installation of a replacement meter.

Figure 10A:
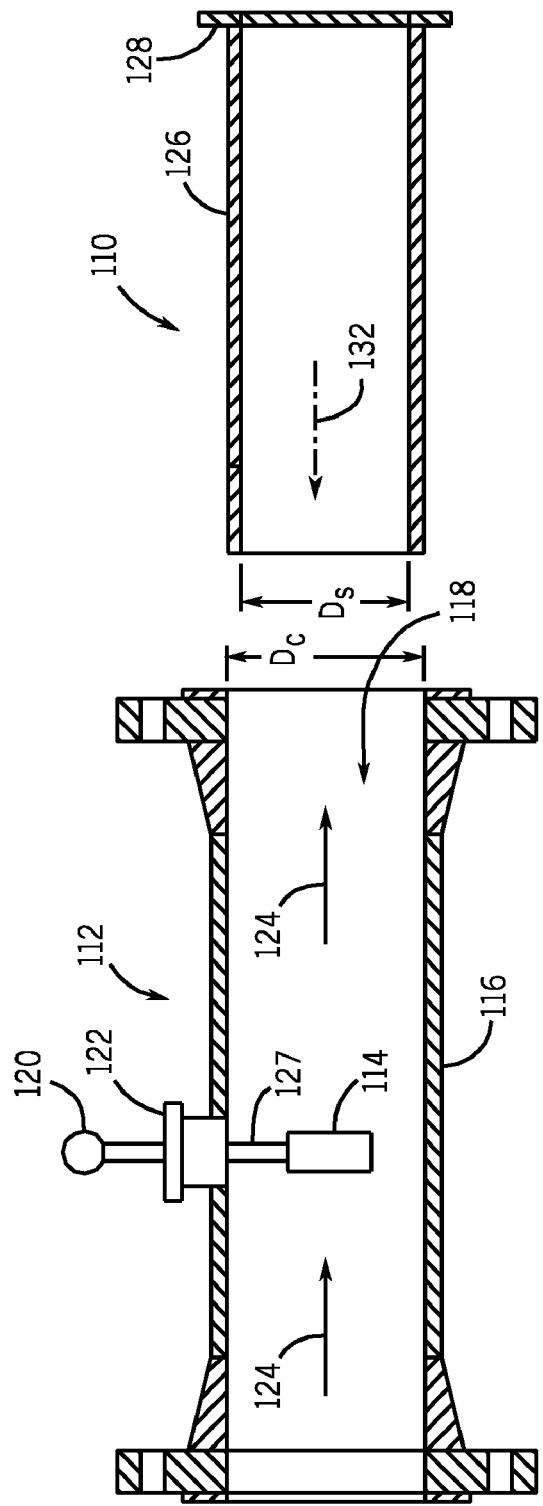
FIGS. 10A and 10B are cross-sections of an area ratio changer used with a vortex meter in accordance with an embodiment of the present invention.
Figure 10B:
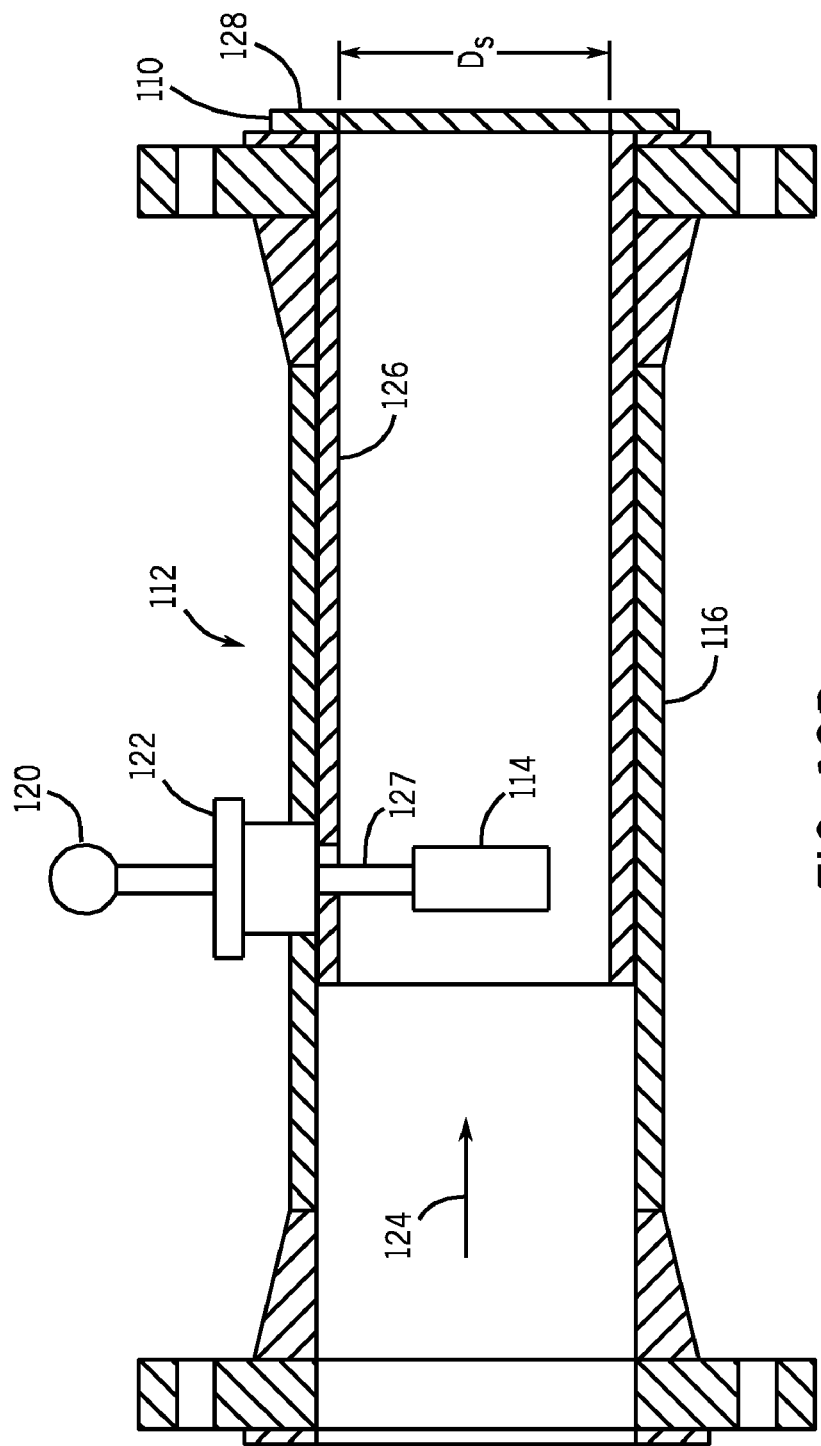

FIGS. 10A and 10B depict use of an area ratio changer 110 with a vortex meter 112 in accordance with another embodiment of the present invention. The vortex meter 112 may include a buff body 114, installed in a structure 116, e.g., a pipe, having a conduit 118. The buff body 114 may be coupled to a mechanical or electrical measuring device 120, e.g., a gauge, through a flange 122. As shown in FIG. 10A, fluid may flow in the conduit 118 in the direction illustrated by arrows 124. The buff body 114 may induce vortices in the fluid as it flows through the conduit 118, resulting in a vortex trail over the bluff body 114. As will be appreciated, the vortex meter 112 may determine the flow rate of the fluid in the conduit 118 based on the relationship between the number of vortices created and the flow rate of the fluid.

In certain embodiments, the ability of the bluff body 114 to produce vortices may be negatively affected by a fluid having a low flow velocity or low Reynolds number. The lowered flow velocity or lower Reynolds number fluid may result in erratic and/or inaccurate output from the vortex meter 112. In such an embodiment, the area ratio changer 110 may be inserted into the conduit 118 to reduce the interior volume of the conduit and increase the flow rate of the fluid, enabling metering capability by the meter 81.

As described above, the area ratio changer 110 may include a sleeve 126 and a flange 128 to enable installation into the conduit 118. The sleeve 126 may an inner diameter $D_S$ less than the inner diameter $D_C$ of the conduit 118. The area ratio changer 110 may include a slot, similar to the embodiment depicted above in FIGS. 3-5, to enable insertion around a stem 127 of the buff body 114. Thus, the area ratio changer 110 may be used to reduce the diameter Dc of the conduit 118 upstream and downstream from the buff body 114. The area ratio changer 110 may be installed in the conduit 118 as indicated by arrow 132 of FIG. 9A.

FIG. 10B depicts the installed area ratio changer 110 in the meter 112 in accordance with an embodiment of the present invention. As shown in FIG. 10B, the sleeve 126 extends into the portions of the conduit 118 downstream and upstream of the buff body 114. Thus, after installation of the area ratio changer 110, the conduit 118 has a diameter $D_C$ equal to the inner diameter $D_S$ of the sleeve 126 (i.e., $D_C=D_S$) in those portions of the conduit 16 downstream and upstream of the buff body 114. By reducing the inner diameter of the conduit 118, the Reynolds number (of flow velocity) of the fluid flowing in the conduit 118 may be increased to within a range more suitable for effective vortex induction by the buff body 114. The increased Reynolds number and/or flow velocity of the fluid may enable easier creation of vortices as the fluid flows over the buff body 114, increasing the effectiveness of the vortex meter 114. Advantageously, as mentioned above, installation of the area ratio changer 110 avoids removal and replacement of the meter 112 and purchase of the replacement meter.

Figure 11:
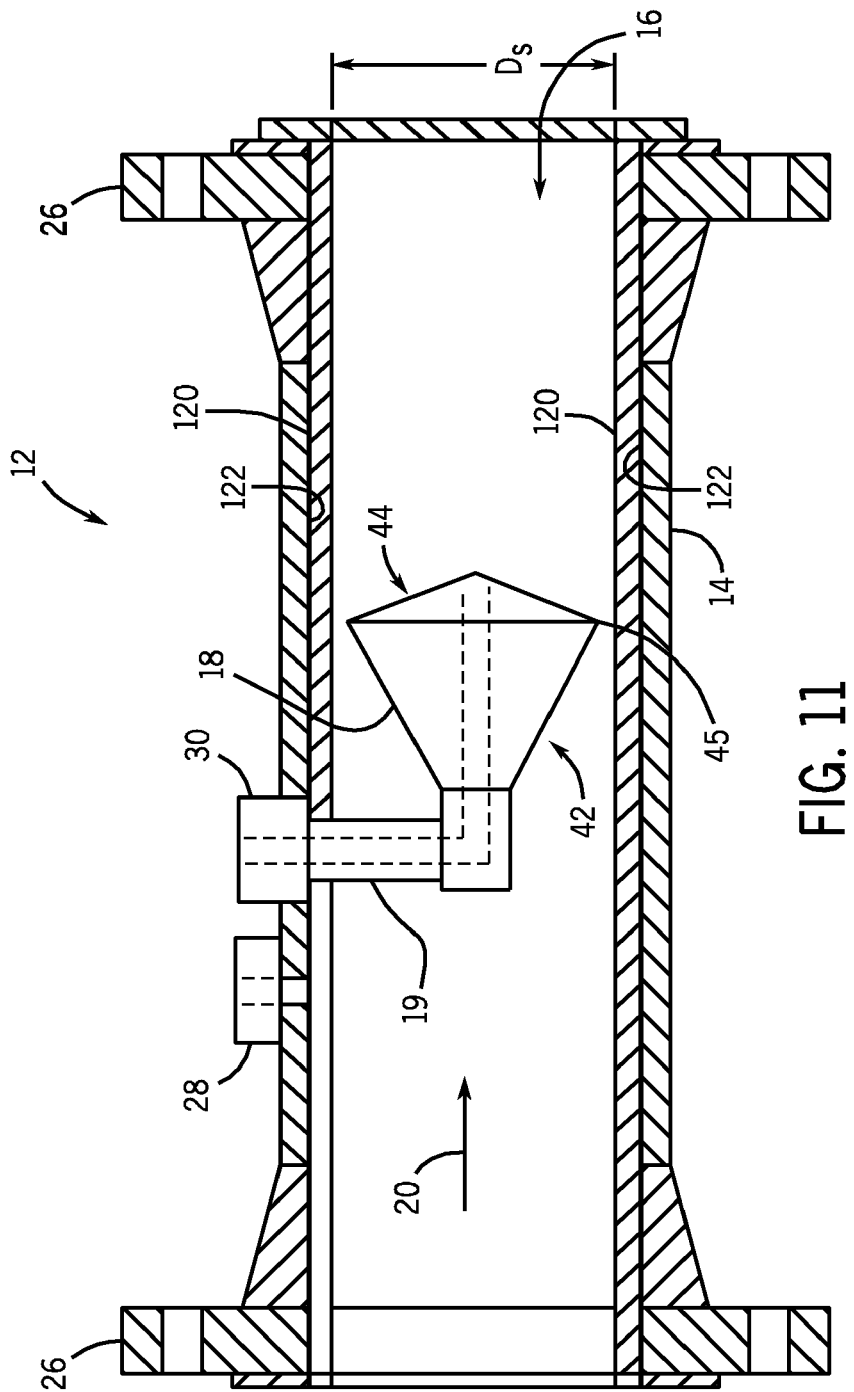
FIG. 11 is a partial cross-section of the meter of FIG. 1 having an erosion-resistant beta ratio changer in accordance with an embodiment of the present invention.

In other embodiments, a beta/area ratio changer may be formed from an erosion-resistant material to protect the conduit of a flow meter. FIG. 11 depicts a beta ratio changer 120 formed from an erosion-resistant material and installed in the differential pressure flow meter 12 as described above in FIGS. 1-3. In addition to changing the beta ratio of the meter 12, as described above, the beta ratio changer 120 may protect an inner wall 122 of the conduit 16 from erosion by the fluid flowing in the conduit 16 of the meter 12. In some embodiments, the fluid may have physical or chemical properties that may erode or otherwise damage the meter body 14, such as by physically or chemically eroding the inner wall 122. For example, the fluid may include particles or other solids that could erode or otherwise damage the inner wall 122. As the fluid flows through the conduit 16, such as in the direction indicated by arrow 20, the beta ratio changer 120 may protect the inner wall 122 of the conduit 16 from eroding properties of the fluid. Thus, the term erosion-resistant may encompass both protection from physical erosion and chemical resistance.

In some embodiments, the erosion-resistant beta ratio changer 120 may be formed from stellite, talonite, tungsten carbide, cemented carbide, or any other suitable material. In other embodiments, the beta ratio changer 120 may be formed from other carbides, or ceramics. As shown in FIG. 11, in some embodiments, the beta ratio changer 120 may extend through the length of the conduit 16, similar to the beta ratio changer 50 described above in FIGS. 1-3. However, an erosion-resistant area ratio changer may be used in any of the applications described above, such as the area ratio changer 72 described above in FIGS. 6-8, the area ratio changer 94 for a flow meter 82 having a Pitot tube 82 described above in FIGS. 9A and 9B, and the area ratio changer 126 for a vortex meter 112 described above in FIGS. 10A and 10B. Any of the above-described area ratio changers may be formed from an erosion-resistant material such as stellite, talonite, tungsten carbide, cemented carbide, or any other suitable material.

In other embodiments, an erosion-resistant insert may be used to maintain the beta ratio or area ratio of a flow meter during operation. The erosion-resistant insert may prevent erosion or other damage of the meter body and prevent changes in the beta ratio (or area ratio) or other properties of the meter that could affect performance of the meter. In such an embodiment, the conduit of the meter body may be machined to accommodate the insert.

Figure 12:
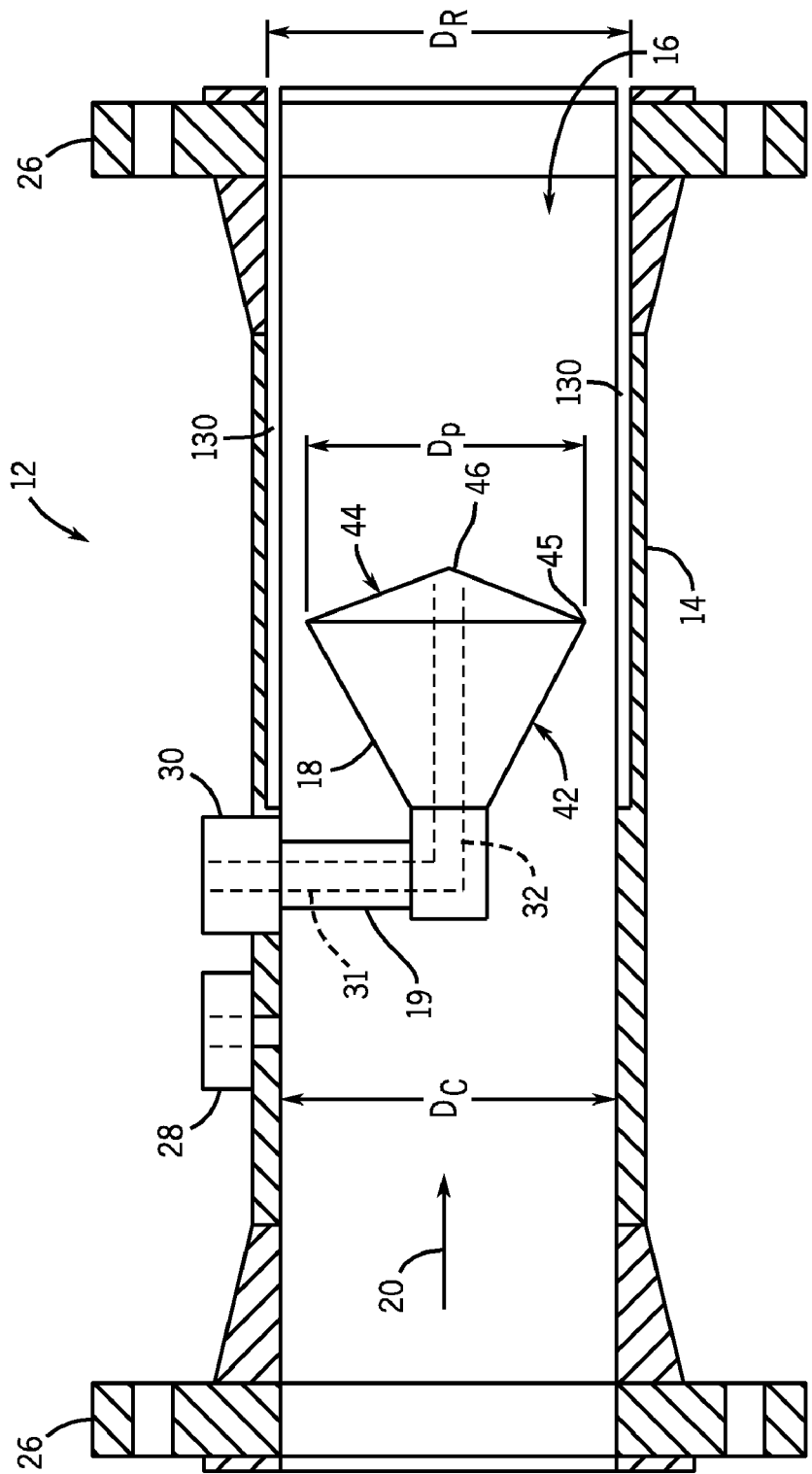
FIG. 12 is a partial cross-section of the meter of FIG. 1 having a recess for receiving an erosion-resistant insert in accordance with an embodiment of the present invention.
Figure 13:
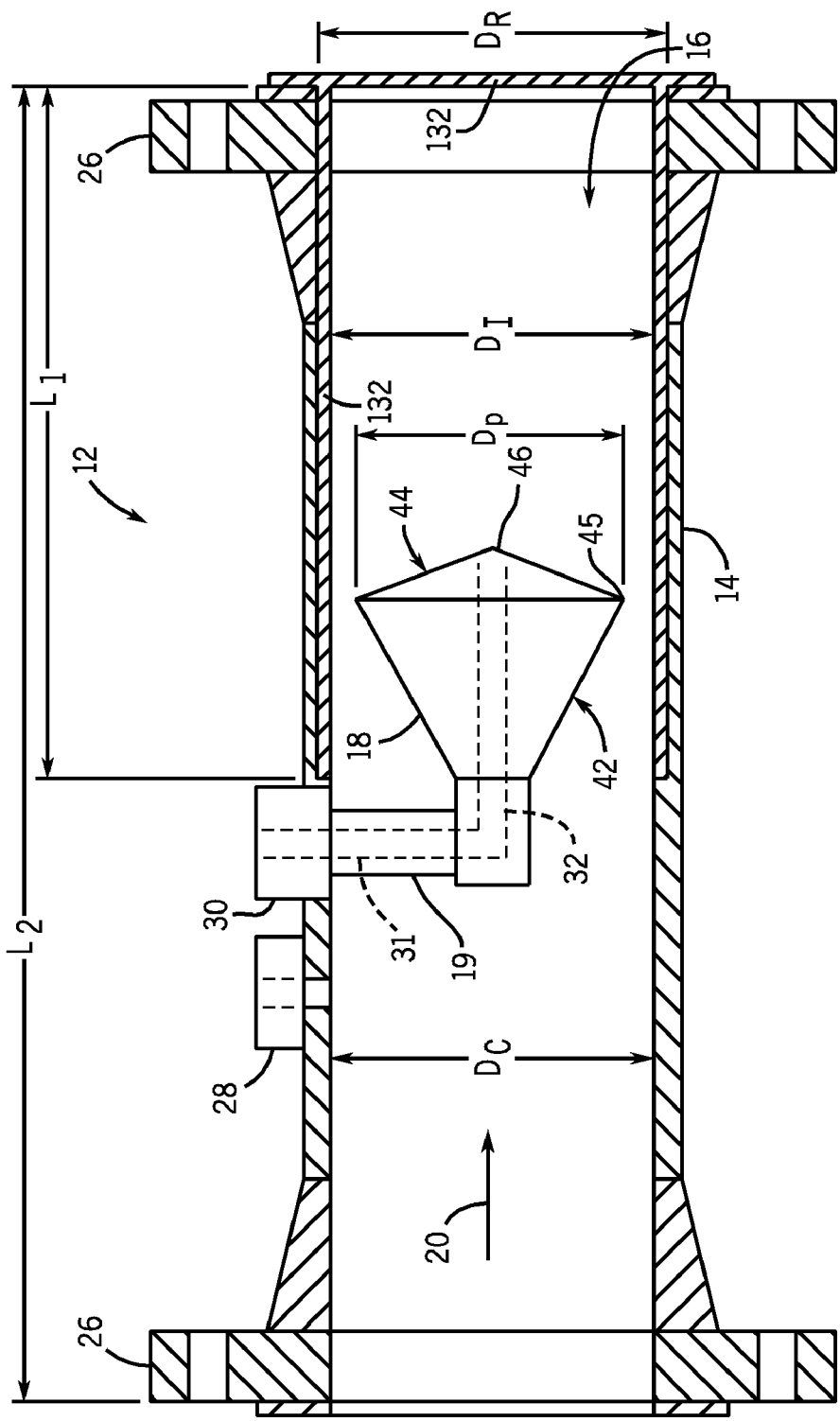
FIG. 13 is a partial cross-section of the meter of FIG. 12 with an erosion-resistant insert in accordance with an embodiment of the present invention.

FIGS. 12 and 13 depict use of an erosion-resistant insert in the differential pressure flow meter 12 described above in accordance with an embodiment of the present invention. As described above, the differential pressure flow meter 12 may includes the meter body 14 having the conduit 16 through which fluid may flow. The fluid displacement member 18 may be centrally disposed in the conduit 16 and suspended from the conduit 16 via the support 19. Fluid may flow through the conduit 16 and over the fluid displacement member 18 in the direction indicated by arrows 20. As also described above, the meter body 14 may include the upstream pressure tap 28 in fluid communication with the conduit 16 and the downstream pressure tap 30 in fluid communication with the interior of the fluid displacement member 18 and the downstream portion of the conduit 16 through hollow region 32. In some embodiments, as noted above, the meter may be coupled to a valve manifold 34 and various other components, such as a transmitter 26 and computer 38.

As noted above, the conduit 16 may have a diameter $D_C$ and the peripheral edge 45 of the fluid displacement member 18 has a diameter of $D_P$. As depicted in FIG. 12, a portion of the meter body 14 may be machined to form a recess, e.g. annular recess 130, in the inner walls 122 of the conduit 16. The annular recess 130 may have a diameter of $D_R$. The annular recess 130 is formed to receive an erosion-resistant insert as depicted in FIG. 13. The diameter $D_R$ of the annular recess 130 may be selected to ensure that the erosion-resistant insert maintains the original diameter $D_C$ of the conduit 16.

FIG. 13 depicts the meter of FIG. 12 with an erosion-resistant insert 132 installed in the meter body 14 in accordance with an embodiment of the present invention. As seen in FIG. 13, the insert 132 may be installed in the recess 130 formed in the conduit 16. Additionally, the insert 132 has a diameter $D_I$ equal to the diameter $D_C$ of the conduit 16. Thus, when installed in the recess 130, the insert 132 maintains the diameter $D_C$ of the conduit 16 and maintains the original beta ratio or area ratio of the 12 (i.e., by maintaining the diameter $D_C$ of the conduit 16 relative to the diameter $D_P$ of the peripheral edge 45 of the fluid displacement member 18). The erosion-resistant insert 132 protects the inner walls 122 of the conduit from erosion by the fluid flowing through the meter 12. For example, as mentioned above, in some embodiments the fluid may have physical and/or chemical properties that could erode or otherwise damage the inner walls 122 of the conduit 16. The insert 132 may be formed from stellite, talonite, tungsten carbide, or any suitable material that provides the desired erosion-resistance for the meter. In other embodiments, the insert 132 may be formed from other carbides, or ceramics The erosion-resistant insert 132 and corresponding recess 130 may be formed at different lengths along the meter body 14. For example, in the embodiment depicted in FIG. 13, the insert 132 and the recess 130 may have a length L1 extending up to the support 19. In other embodiments, the insert 132 may have a length L2 corresponding to all or substantially all of the length of the conduit 16. In such embodiments, the insert 132 may be constructed similar to the beta ratio changer 50 depicted above in FIGS. 4 and 5 to include a slot to accommodate the support 19. In such an embodiment, the recess 130 may be formed in both the upstream portion and downstream portion of the meter body 14 (e.g., on both side of the fluid displacement member 18). In other embodiments, the length of the insert 132 and the recess 130 may be between L1 and L2. Further, in some embodiments, the recess 130 may be formed at a length slightly greater than the length of the insert 132 to provide for easier installation of the insert 132.

Figure 14:
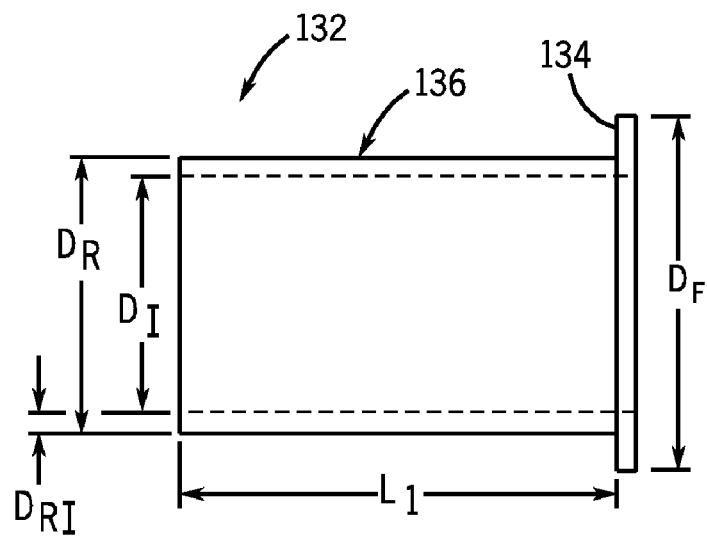
FIG. 14 is a cross-section of the erosion-resistant insert of FIG. 13 in accordance with an embodiment of the present invention.

FIG. 14 depicts a cross-section of the erosion-resistant insert 132 of FIG. 13 in accordance with an embodiment of the present invention. The insert 132 may include a flanged portion 134 and a sleeve 136. The sleeve 136 may define the outer diameter $D_R$ and the inner diameter $D_I$, as mentioned above, defining a thickness $D_{RI}$ of the sleeve 136. As described above, the inner diameter $D_I$ of the sleeve may equal the inner diameter $D_C$ of the conduit 16. Thus, the thickness of the sleeve $D_{RI}$ is equal to the thickness of the recess ($D_R$-$D_C$). When installed in the recess 130, the insert 132 provides the original diameter $D_C$ of the conduit, thus maintaining the original beta ratio or area ratio of the meter 12. As also discussed above, the sleeve may have a length L1 equal to or substantially equal to the length of the recess L1.

The flange 134 may have an outer diameter $D_F$ approximately the same as or less than the outer diameter of the flange 26 of the body 14 of the meter 12. The flange 134 may be of relatively reduced thickness compared to the thickness of the flange 26 of the body 14 of the meter 12, such that when the insert 132 is installed in the conduit 16 the flange 134 provides minimal increase of thickness between the flange 26 and other components. In some embodiments, the insert 132 may be secured by the flange 134 disposed between the flange 26 and another component coupled to the meter 12. In some embodiments, the insert 132 may be coupled to the meter 12 by fasteners such as bolts or screws. In yet other embodiments, the insert 132 may be threadingly coupled to the meter 12.

Figure 15:
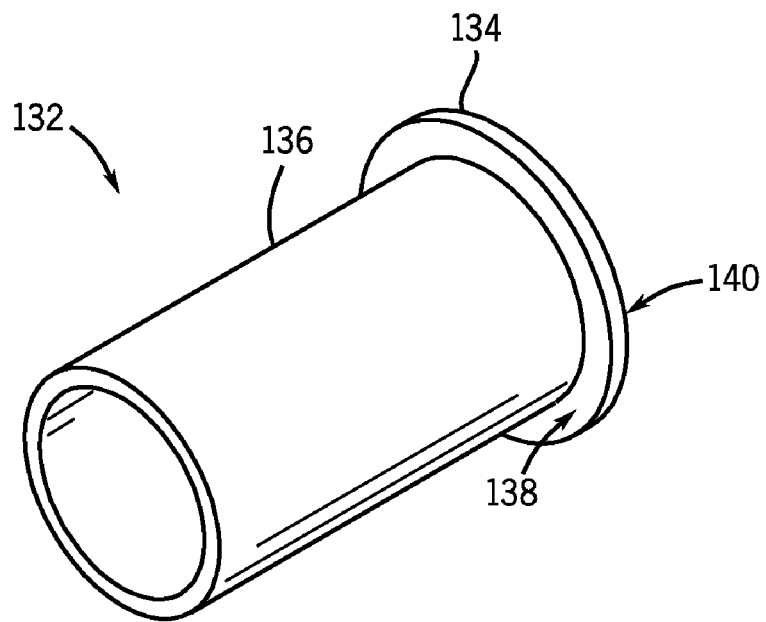
FIG. 15 is a perspective view of the erosion-resistant insert of FIG. 13 in accordance with an embodiment of the present invention.

FIG. 15 is a perspective view of the erosion-resistant insert 132 of FIG. 13 in accordance with an embodiment of the present invention. During installation, one or more seals, e.g., o-rings, may be disposed on a first face 138 of the flange 134 and a second face 140 of the flange 134 to ensure sealing against the flange 26 of the meter 12 and any components coupled to the meter 12. As mentioned above, the insert 132 may be formed from stellite, talonite, tungsten carbide, or other suitable erosion-resistant materials. In some embodiments, both the sleeve 136 and the flange 134 may be formed from the erosion-resistant material or only the sleeve 136 may be formed from the erosion-resistant material. In some embodiments, the interior wall of the sleeve 136 may be formed to at least a surface finish of ISO Standard 1302.

Figure 16:
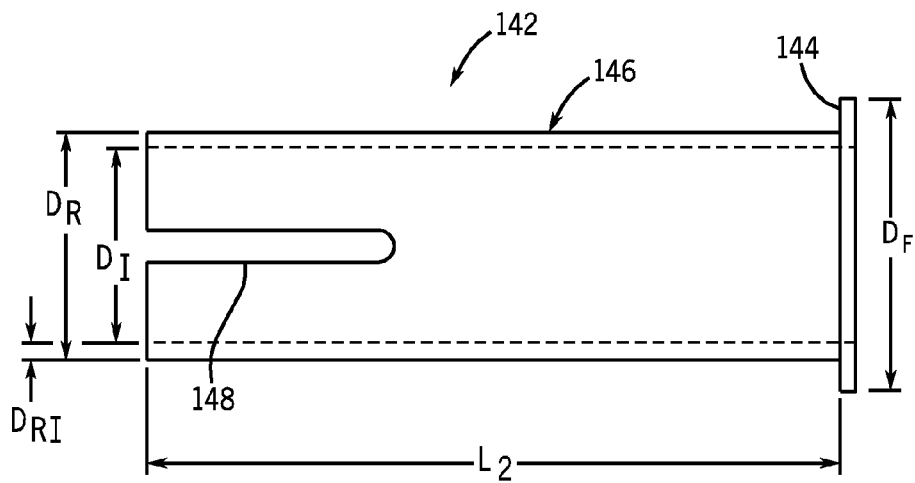
FIG. 16 is a cross-section of an erosion-resistant insert in accordance with another embodiment of the present invention.
Figure 17:
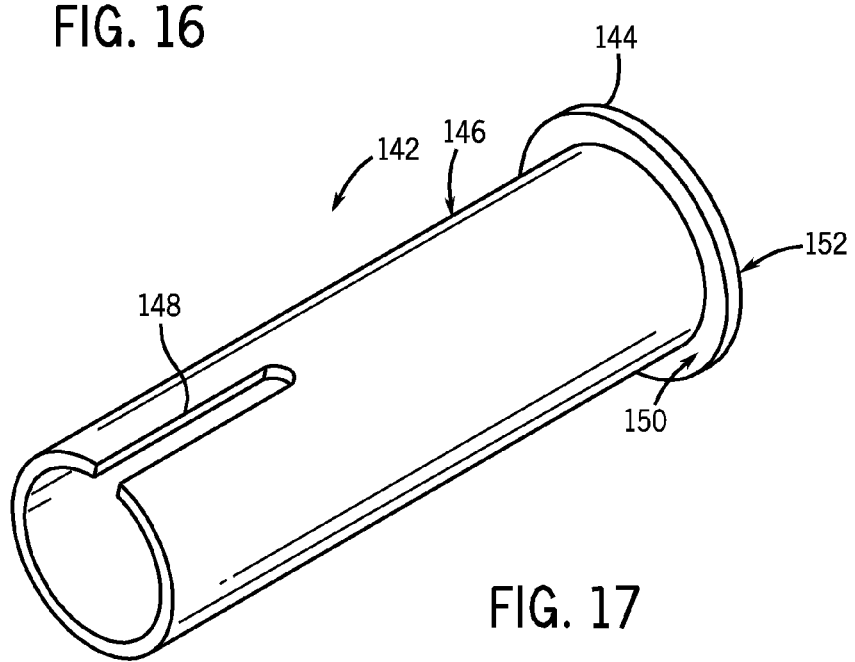
FIG. 17 is a perspective view of an erosion-resistant insert in accordance with an embodiment of the present invention.

In other embodiments, as mentioned above, the insert may extend to a length L2. FIG. 16 depicts a cross-section and FIG. 17 depicts a perspective view of an erosion-resistant insert 142 having a length L2 in accordance with an embodiment of the present invention. As discussed above, the insert 142 includes a flanged portion 144 and a sleeve 146. The sleeve 146 may define an outer diameter $D_R$ and the inner diameter $D_I$, as mentioned above, defining a thickness $D_{RI}$ of the sleeve 146. As described above, the inner diameter $D_I$ of the sleeve 146 may be equal to the inner diameter $D_C$ of the conduit 16, ensuring that the insert 142 maintains the diameter of the conduit 16. As also discussed above, the sleeve may have a length L2 equal to about the length of a recess formed in the conduit 16.

The insert 142 having a longer length L2 may also include a slot 148. The slot 148 may extend axially along the length of the sleeve 146 and accommodate the support 19 to enable the flange 144 to be flush with the flange of the body of the meter 12 when the insert is inserted into the body of the meter 12. The slot 148 may receive the upstream and downstream ports 28 and 30, enabling the sleeve 146 to be inserted around the ports. Further, the slot 148 ensures fluid communication between the port 28 and the conduit 16. The flange 144 may have an outer diameter $D_F$ approximately the same as or less than the outer diameter of the flange 26 of the body 14 of the meter 12. Again, the flange 144 may be of relatively reduced thickness compared to the thickness of the flange 26 of the body 14 of the meter 12. In some embodiments, the insert 142 may be secured by the flange 144 disposed between the flange 26 and another component coupled to the meter 12. In some embodiments, the insert 142 may be coupled to the meter 12 by fasteners such as bolts or screws. In yet other embodiments, the insert 142 may be threadingly coupled to the meter 12.

As also noted above, the flange 144 may include one or more seals, e.g., o-rings, disposed on a first face 150 of the flange 144 and a second face 152 of the flange 146 to ensure sealing against the flange 26 of the meter 12 and any components coupled to the meter 12. The insert 142 may be formed from stellite, talonite, tungsten carbide, or other suitable erosion-resistant materials. In other embodiments, the insert 142 may be formed from other carbides, or ceramics. In some embodiments, both the sleeve 146 and the flange 144 may be formed from the erosion-resistant material or only the sleeve 146 may be formed from the erosion-resistant material. In some embodiments, the interior wall of the sleeve 136 may be formed to at least a surface finish of ISO Standard 1302.

In other embodiments, an erosion-resistant insert may used to protect the inner walls of other meters and maintain the inner diameter of a conduit of such meters. For example, an erosion-resistant insert may be used in any of the applications described above, such as the flow meter 82 having a Pitot tube 82 described above in FIGS. 9A and 9B, and the vortex meter 112 described above in FIGS. 10A and 10B. An erosion-resistant insert may be installed in the manner described above, such as by machining a recess in a conduit of a meter and inserting the insert. Such erosion-resistant inserts may also be formed from an erosion-resistant material such as stellite, talonite, tungsten carbide, cemented carbide, other carbides, ceramics, or any other suitable material.

Figure 18:
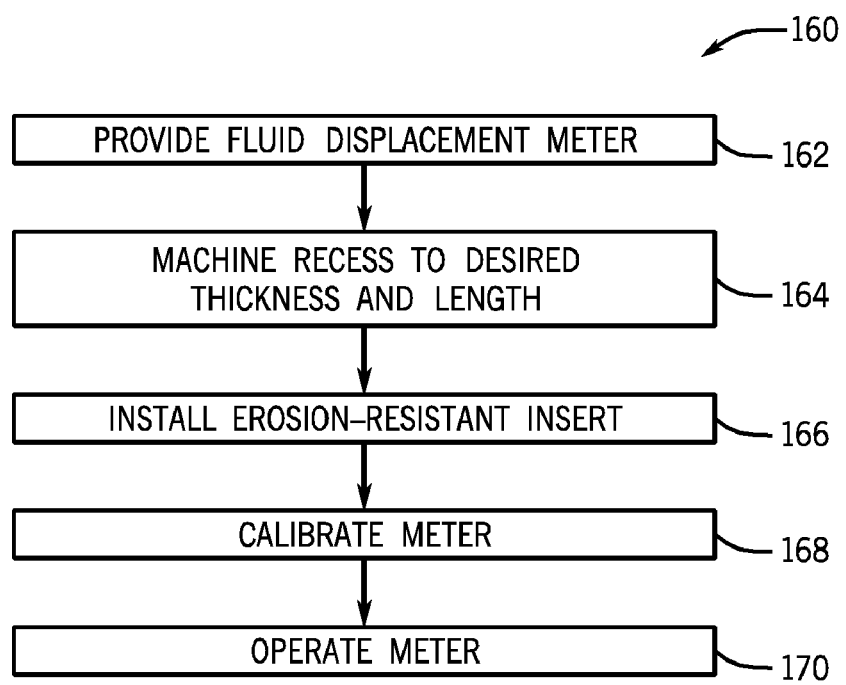
FIG. 18 is a flowchart for installing an erosion resistant insert in a fluid measurement device in accordance with an embodiment of the present invention.

FIG. 18 depicts a process 160 for installing and using an erosion-resistant insert in a fluid measurement device, such as a flow meter, in accordance with an embodiment of the present invention. Initially, a flow meter 160 may be provided (block 162). The meter may be a new meter, or the meter may be an existing meter and the erosion-resistant insert provided as a part of a retrofit kit. A recess may be machined in the conduit of the meter body to receive the insert (block 164). As mentioned above, the recess may be machined any one of different lengths to receive an insert. The insert may be installed in the conduit of the meter body to maintain the diameter $D_C$ of the conduit 16 (block 166). After insertion, the meter may be calibrated (block 168). Finally, the meter may be operated with the erosion-resistant interior of the conduit provided by the insert (block 170).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
   a flow measurement device, comprising:
      a fluid conduit having an inner first diameter;
      a first pressure tap and a second pressure tap through a wall of the fluid conduit;
      a fluid displacement member disposed in the fluid conduit, wherein the fluid displacement member comprises an upstream sloping surface that diverts fluid within the fluid conduit, and the fluid displacement member and the fluid conduit define a beta ratio for the flow measurement device; and
   an erosion-resistant insert configured to removably couple to the flow measurement device, the erosion-resistant insert comprising:
      a flanged portion; and
      a sleeve portion configured to extend into the fluid conduit and maintain the beta ratio, wherein the sleeve portion has an inner diameter equal to the first inner diameter of the fluid conduit, wherein the sleeve portion comprises an erosion-resistant material.

2. The system of claim 1, wherein the fluid displacement member defines a peripheral edge separating the upstream sloping surface from a downstream sloping surface.

3. The system of claim 2, wherein the erosion-resistant insert extends at least around the peripheral edge of the fluid displacement member.

4. The system of claim 2, wherein the erosion-resistant insert extends fully around the fluid displacement member.

5. The system of claim 1, comprising a support coupling the fluid displacement member to the wall of the fluid conduit, wherein the support is in fluid communication with the second pressure tap.

6. The system of claim 5, comprising a slot in the sleeve portion of the erosion-resistant insert and configured to extend around the support.

7. The system of claim 1, wherein the erosion-resistant material comprises stellite, tungsten carbide, or cemented carbide.

8. The system of claim 1, wherein the fluid conduit comprises a recess having an outer second diameter to receive the erosion-resistant insert.

9. The system of claim 8, wherein the sleeve portion comprises an outer diameter equal to the outer second diameter of the fluid conduit.

10. A system, comprising:
    an erosion-resistant insert for a flow measurement device, comprising:
       a flanged portion; and
       a sleeve portion extending axially from the flanged portion, wherein the sleeve portion is and configured to insert into a fluid conduit of the flow measurement device and maintain the beta ratio of the flow measurement device, and the sleeve portion comprises stellite, tungsten carbide, or cemented carbide.

11. The system of claim 10, wherein the sleeve portion comprises an axial slot.

12. The system of claim 10, wherein the flanged portion comprises stellite, tungsten carbide, or cemented carbide.

13. The system of claim 10, wherein the sleeve portion comprises a first inner diameter equal to a second inner diameter of the fluid conduit.

14. The system of claim 10, wherein the sleeve portion comprises a first length that extends to a fluid displacement member of the flow measurement device.

15. The system of claim 10, wherein the sleeve comprises a first length that extends to a second length of the fluid conduit.

16. A method, comprising:
    machining a recess in a conduit of a body of a flow measurement device, wherein the conduit has an inner first diameter and the recess has an inner second diameter; and
    inserting an erosion-resistant insert into the recess of the conduit, wherein the insert comprises a sleeve having an inner third diameter equal to the inner first diameter and an outer fourth diameter equal to the inner second diameter, wherein the sleeve comprises an erosion-resistant material.

17. The method of claim 16, comprising maintaining a beta ratio of the flow measurement device by inserting the erosion-resistant insert into the recess.

18. The method of claim 16, comprising measuring the flow rate of a fluid flowing through the conduit of the body of the flow measurement device.

19. The system of claim 18, wherein the fluid comprises oil, natural gas, or steam.

20. The system of claim 19, comprising inserting the erosion-resistant insert around a fluid displacement member of the flow measurement device.

* * * * *